(12) United States Patent
Green (10) Patent No.: US 7,379,984 B1
(45) Date of Patent: May 27, 2008

(54) APPARATUS, SYSTEM, AND METHOD FOR AUTONOMY CONTROLLED MANAGEMENT OF A DISTRIBUTED COMPUTER SYSTEM

(75) Inventor: Howard H. Green, Carlsbad, CA (US)

(73) Assignee: EMC Corporation, Hopkinton, MA (US)

( * ) Notice: Subject to any disclaimer, the term of this patent is extended or adjusted under 35 U.S.C. 154(b) by 845 days.

(21) Appl. No.: 10/731,797

(22) Filed: Dec. 9, 2003

(51) Int. Cl.
*G06F 15/177* (2006.01)

(52) U.S. Cl. .................. 709/220; 709/221; 709/223

(58) Field of Classification Search ........ 709/220–226, 709/201, 203
See application file for complete search history.

(56) References Cited

U.S. PATENT DOCUMENTS

| | | | |
|---|---|---|---|
| 6,052,684 A * | 4/2000 | Du ................................ 707/8 |
| 6,058,426 A * | 5/2000 | Godwin et al. ............. 709/223 |
| 6,286,038 B1 * | 9/2001 | Reichmeyer et al. ....... 709/220 |
| 6,421,719 B1 * | 7/2002 | Lewis et al. ................ 709/223 |
| 6,480,901 B1 * | 11/2002 | Weber et al. ............... 709/223 |
| 6,694,362 B1 * | 2/2004 | Secor et al. ................ 709/223 |
| 6,862,573 B2 * | 3/2005 | Kendall et al. ................ 705/7 |
| 6,871,221 B1 * | 3/2005 | Styles ........................ 709/220 |
| 6,978,379 B1 * | 12/2005 | Goh et al. ..................... 713/1 |
| 7,103,874 B2 * | 9/2006 | McCollum et al. ......... 709/220 |
| 7,191,141 B2 * | 3/2007 | Motoyama ..................... 705/7 |
| 2005/0050013 A1 * | 3/2005 | Ferlitsch ........................ 707/3 |

* cited by examiner

*Primary Examiner*—Philip B Tran
(74) *Attorney, Agent, or Firm*—Gavrilovich, Dodd & Lindsey, LLP; Charles D. Gavrilovich, Jr.

(57) ABSTRACT

An apparatus, system, and method provide autonomy control for management of a distributed computer system. An autonomy-based configuration procedure executes a plurality of configuration tasks in accordance with autonomy criteria. Autonomous configuration tasks of the configuration procedure are identified based on the autonomy criteria and are not executed unless explicit authorization is received. Autonomous configuration tasks are executed without intervention. An administrator establishes a desired degree of autonomy by entering the autonomy criteria prior to invoking the configuration procedure.

21 Claims, 4 Drawing Sheets

APPARATUS, SYSTEM, AND METHOD FOR AUTONOMY CONTROLLED MANAGEMENT OF A DISTRIBUTED COMPUTER SYSTEM

BACKGROUND OF THE INVENTION

The invention relates in general to distributed computer systems and more specifically to an apparatus, system, and method for managing a distributed computer system.

Distributed computer systems may include any number of networked devices such as computers, servers, and memory storage devices that are interconnected through a network. The network typically includes a combination of interconnected network devices such as hubs, switches, and routers. Many of the network devices and networked devices operate in accordance with a configuration that can be set and modified. The configuration is typically managed with the use of configuration objects that represent logical or virtual arrangements and relationships and define any number of structures, allocations, operational rules, priorities, preferences, or functions related to memory, data storage, bandwidth, communication paths, and communication protocols. A configuration object includes procedures and data that define the configuration of at least a portion of the system, where the data includes configuration parameters that represent settings or other stored values pertaining to individual devices. Configuration parameters, therefore, may include settings, addresses, names, identifiers, pathnames, operational minimums and maximums, bandwidths, time limits and other values. By setting and managing the configuration objects, management tasks can be performed. An example of a management task includes establishing an end-to-end path between a host system and a networked storage device that may include the configuration tasks of creating a storage volume, setting the access controls of the storage volume, setting the access controls of the network and configuring the host adapters. The configuration parameters are often chosen or otherwise established during an initial configuration of the system and are periodically adjusted for various reasons by modifying and managing the configuration objects. Typically, the configuration is established and adjusted in response to changes in the needs that the system must fulfill, to meet such purposes as allocating and providing access to resources such as storage or network capacity, for protecting such resources, and to maximize the performance and efficiency of the individual devices and the system as a whole. Often, the distributed computer system is managed by an administrator that directly interfaces with some all of the system devices to set or change the configuration. As the size and complexity of distributed computer systems increase, the management of the system also increases in complexity making the responsibility of maintaining and managing the system extremely burdensome.

An approach for dealing with the growing management problem involves automating management procedures using system management software. This approach, however, is limited in that administrators are reluctant to relinquish control to automated management procedures for several reasons. Often, administrators perceive a risk that the automated procedure may cause undesirable results that can not be rectified. Although some of the perceived risks may be less reasonable than others, many of the concerns are warranted. Since software is not completely reliable, actual damage to the system may occur. Data can be lost or performance degraded and applications running concurrently with the system management software may be adversely effected. The applications may be critical to the proper operation of the system and any failure may result in substantial financial loss. Further, even if the administrator trusts the system management software to properly execute the individual automated management tasks of the automated procedure, the administrator may prefer to control the timing of the execution in order to apply additional preferences based on an overall understanding of system operation and configuration objectives. For example, certain management tasks may be better suited for executions during times when the system resources are less taxed by other applications running on the system. The administrator may be sensitive to system operations, configurations, and configuration changes that are not considered by the automated procedure. With conventional systems, the administrator must relinquish all control to the automated configuration procedure or manually perform the configuration.

Accordingly, there is need for an apparatus, system and method for autonomy-based management of a distributed computer system.

DETAILED DESCRIPTION OF THE PREFERRED EMBODIMENTS

An apparatus, system, and method provide autonomy control for management of a distributed computer system. An autonomy-based configuration procedure executes a plurality of configuration tasks in accordance with autonomy criteria that indicates a degree of autonomy granted to the configuration procedure. Non-autonomous configuration tasks of the configuration procedure are identified based on the autonomy criteria and are not executed unless explicit authorization is received. Autonomous configuration tasks are executed without intervention. In the exemplary embodiment, an administrator establishes a desired degree of autonomy by entering the autonomy criteria prior to invoking the configuration procedure. By providing the autonomy criteria, the administrator controls the execution of the configuration procedure to allow execution of autonomous configuration tasks without administrator participation or intervention while restricting the execution of non-autonomous configuration tasks. The administrator, therefore, allows those configuration tasks that are trusted and not perceived as potentially resulting in unwanted results to occur efficiently and without administrator interaction. Other configuration tasks, however, that the administrator prefers to monitor, modify, verify or avoid are not performed without the participation of the administrator. As the administrator becomes more comfortable with the configuration procedure, the autonomy of the configuration procedure is increased by adjusting or entering new autonomy criteria. As a result, system management procedures utilizing the autonomy controlled configuration procedure are more easily accepted and used by system administrators. System management of a distributed computer system is efficiently performed while the risk of data loss, system failure, and other undesired results is minimized.

Figure 1:
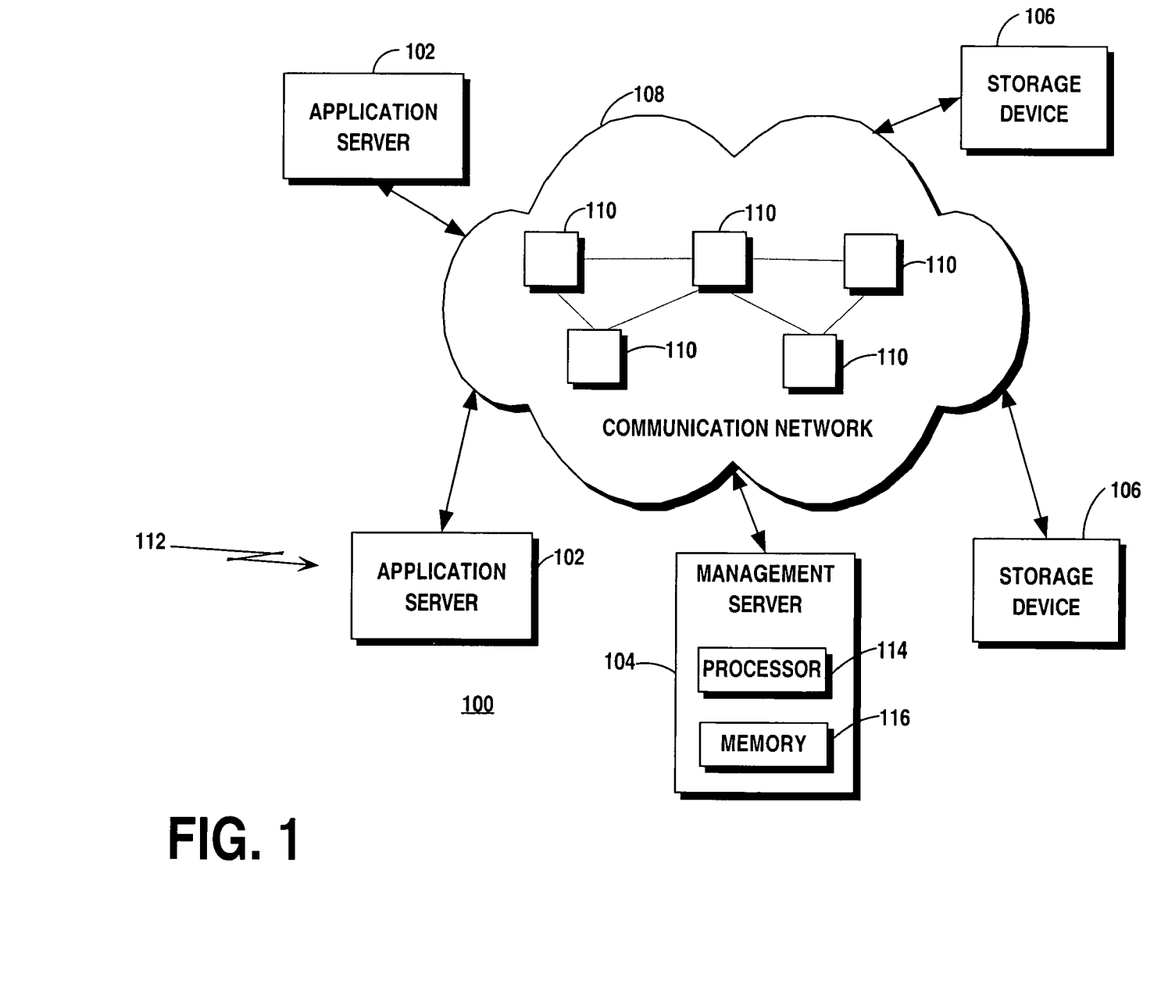
FIG. 1 is a block diagram of distributed computer system in accordance with the exemplary embodiment of the invention.

FIG. 1 is a block diagram of a distributed computer system 100 in accordance with the exemplary embodiment of the invention. The distributed computer system 100 may include any combination of hardware, software, and infrastructure where at least a portion of the hardware is geographically distributed and interconnected through one or more communication channels. The distributed computer system 100 includes any number of networked devices 112 (102-106) connected through a network 108. Examples of networked devices 112 include storage devices 106, server computers such as application servers 102, and management servers 104. The application servers 102, the management server 104 and the storage devices 106 are collectively referred to as networked devices 112. In some circumstances, other combinations and types of networked devices 112 may be used.

The application server 102 may include any combination of processors and memory that perform the functions of a server computer that is suitable for running software applications. The applications may communicate with other networked devices 112 such as other application servers 102 and storage devices 106. In many situations, the application servers 102 may be accessed by work stations, personal computers, or other devices connected to the communication network 108.

In the exemplary embodiment, the storage devices 106 are mass storage devices such as disk drives or tape drives. Other types of storage devices may be used in some circumstances. Some storage devices 106, for example, may include optical disks.

The communication network 108 includes network devices 110 that facilitate communication between networked devices 112 as well as other network devices 110. Examples of network devices 110 include hubs, routers, switches, gateways, and other hardware, infrastructure and software that facilitate the transmission of data, instructions and messages throughout the network 108. The network devices 110 may be interconnected using any of several known communication infrastructures and communication media such as wire, fiber optic cable, and wireless channels such as infrared, radio frequency (RF), microwave, satellite and optical communication channels.

Any combination of topologies can be used to implement the communication network 108 including topologies utilizing bus, star, and ring topology techniques. Further, the communication network 108 or portions of the communication network 108 may include any number of local area networks (LANs), wide area networks (WANs), and storage area networks (SANs). The communication network 108 transmits data, signals, and messages using one or more protocols. Examples of suitable protocols are protocols utilized in Ethernet and Fibre Channel networks.

Those skilled in the art will readily recognize the various topologies, protocols, architectures, and implementations of the communication network 110 and the distributed computer system 100 that can be used based on these teachings and known techniques. The functions and operations of the blocks described in FIG. 1 may be implemented in any number of devices, circuits, or infrastructure. Two or more of the functional blocks may be integrated in a single device and the functions described as performed in any single device may be implemented over several devices. For example, a hardware component within the system 100 may operate as a networked device 112 as well as a network device 110 in some situations.

The management server 104 includes at least a processor 114 and a memory 116 for running system management software and other software facilitating the overall functionality and operation of the management server 104. The processor 114 is any type of processor, processor arrangement or computer configured to execute computer readable code and includes one or more processors or computers. At least a portion of the memory 116 includes a non-volatile memory medium suitable for storing the computer readable code such as a disk drive. In the exemplary embodiment, the management server 104 is a server computer running system management software that utilizes one or more interface modules to communicate with the network devices 110 and networked devices 112 (102, 106). The interface modules include at least software code that performs translation, conversion or interface functions to allow the management server 104 to set, change, monitor or retrieve configuration parameters of a network device 110 or a networked device 112. The implementation and operation of the interface modules depend on the particular devices 110, 102, 106 that are accessed, the information that is exchanged and other factors related to the distributed communication system 100 and the system management procedure. Depending on the particular device 110, 112, the interface modules may be commercially available or may be implemented based on the particular protocol and other requirements of the devices 110, 112. The functionality of the interface modules may be implemented in a single module or computer program or may be distributed over several hardware device, programs, subprograms or subroutines.

The methods and apparatus of this invention may take the form, at least partially, of program logic or program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. When the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system 100 and management server 104 described with reference to FIG. 1. One aspect of the invention is embodied as a method that is described below with reference to FIGS. 2-4. In the exemplary embodiment described herein, computer readable code stored in memory 116 is executed by the processor 114 within the management server 104. Other types and combinations of hardware, software and firmware may be used implement the functions described. For purposes of illustrating the present invention, therefore, the invention is described as embodied in a specific configuration, but one skilled in the art will appreciate that the device is not limited to the specific configuration but rather only by the claims included with this specification.

In the exemplary embodiment, the management server 104 performs an autonomy-based configuration procedure that retrieves, monitors, establishes, modifies and otherwise manages configuration objects defining the configuration of the network devices 110 and networked devices 102, 106 in accordance with the configuration criteria defined by the system management software. The management server 104, by running the system management software, performs one or more autonomy-based configuration procedures. An autonomy-based configuration procedure executes a series of configuration tasks that create, delete, or modify configuration objects. A modification of a configuration object may include associating a configuration with one or more other configuration objects, building additional configuration objects based on the configuration object, instructing the configuration object to perform functions upon itself or other configuration objects, or otherwise manipulating the configuration object. The configuration objects include data representing the configuration parameters of the various devices 102, 106, 110 within the system. In the exemplary embodiment, a system management procedure running on the management server analyzes the status of the distributed computer system and makes any changes in accordance with the rules defined within the procedure by executing the autonomy-based configuration procedure. The autonomy-based configuration procedure executes the configuration tasks in accordance with the autonomy criteria. The configuration objects and, therefore, the configuration parameters are modified as dictated by an autonomy-based configuration procedure. The number and types of configuration objects and parameters depend on the particular system management software and on the characteristics of the particular system 100 such as the size, speed, complexity, compatibility and number of devices, and infrastructure of the system 100 as well as other factors that will be readily recognized by those skilled in the art based on these teachings. Examples of configuration tasks include the construction or removal or modification of logical or virtual entities such as virtual private networks, file systems, logical storage volumes, computing clusters, or communication paths; the modification of attributes or parameters such as names, addresses, priorities, permitted modes of operation, access controls, capacities, or levels of service; and the assignment of resources to or removal of resources from applications, such as the assignment of storage resources to a database application, or the assignment of network load balancing resources to an application such as a web server. Those skilled in the art will recognize the other types of configuration tasks that may be performed in accordance with known techniques based on the teachings herein.

In the exemplary embodiment, each configuration task is represented as a data structure that contains a collection of attributes and data, where the data may include any number of identifiers, descriptions, or characterizations related to the configuration task operation and the configuration parameter or configuration object to which the configuration task will be applied. Examples of data included in a configuration data structure include a parameter identifier that identifies the particular configuration object or configuration parameter to which the configuration task applies, a configuration object type identifier identifying the type of configuration object or parameter to which the configuration task applies, a task operation indicator indicating the operation to be performed on the configuration object or parameter, and an object location indicating the location of the configuration object or parameter. Examples of task operation indicators include operations to create, delete, expand, contract, and rename objects as well as others that will be recognized by those skilled in the art based on these teachings. In addition, other global data may be represented such as the time and date and the current system status indicting the current system configuration. Therefore, in the exemplary embodiment, data is stored that includes information related to each configuration procedure, each configuration task and the current status of the system 100.

Although other representations may be used in some circumstances, the autonomy criteria are represented by a set of autonomy rules in the exemplary embodiment. An autonomy rule includes a conditional expression, such as Boolean expression, that draws on the available information and a disposition that indicates whether the configuration task should be executed. In the exemplary embodiment, autonomy rules are formed by presenting the available information and data to the administrator in an easily understood format and allowing the administrator to construct the rules from a set of possible operators and fields. As discussed below, a suitable method of constructing the autonomy rules includes invoking a wizard utility that provides the administrator with a user interface for efficiently assembling the particular autonomy rule.

When the autonomy-based configuration procedure is executed, the autonomy rules are applied to available data to determine if the configuration task should be autonomously executed. Where a particular autonomy rule results in the determination that the configuration should not be autonomously executed, the administrator is notified through the user interface. Further instruction may be requested from the administrator in some circumstances.

Figure 2:
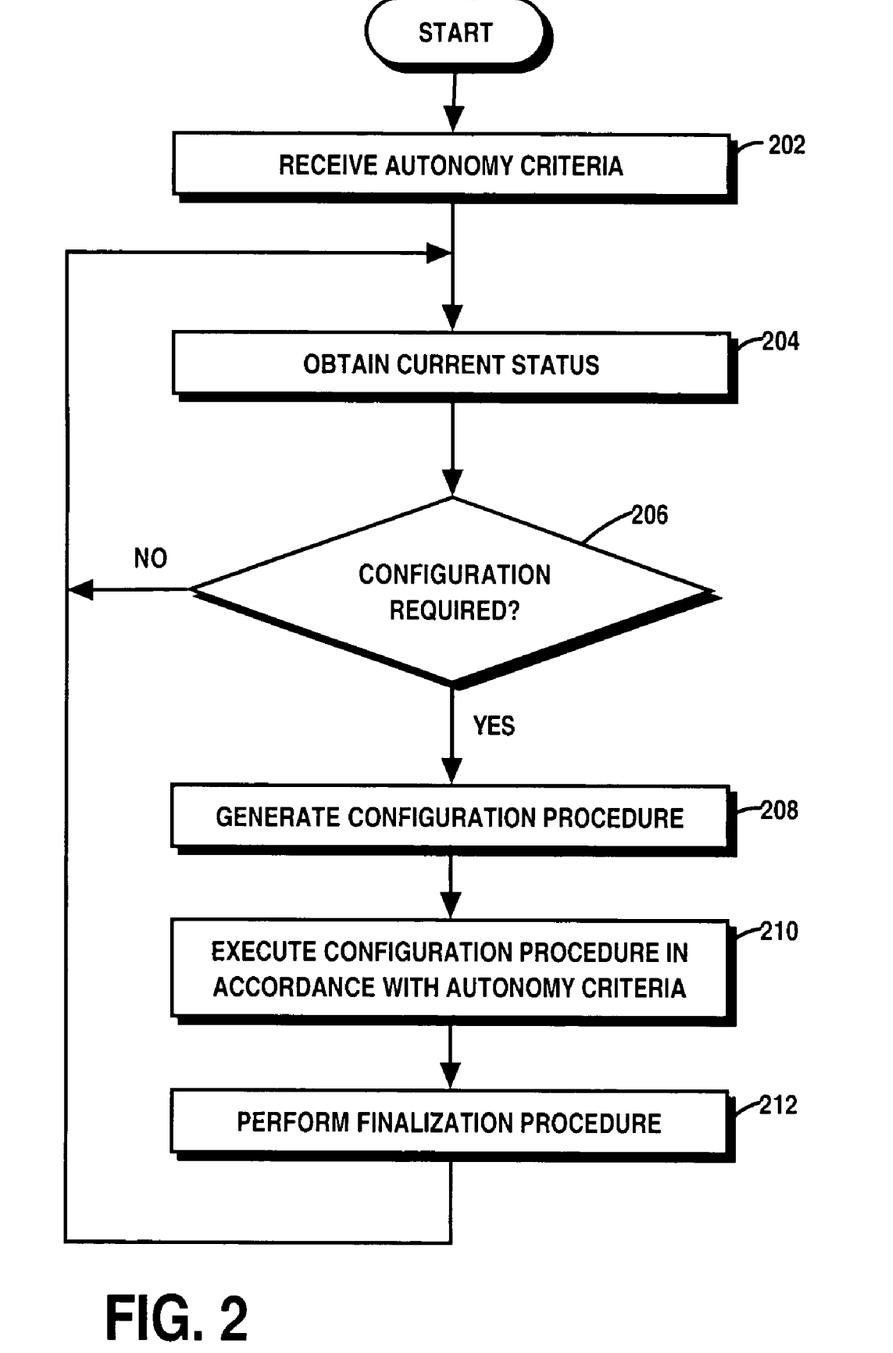
FIG. 2 is a flow chart of an exemplary system management procedure suitable for including an autonomy based configuration procedure.

FIG. 2 is a flow chart of an exemplary system management procedure suitable for including an autonomy-based configuration procedure. In the exemplary embodiment the system management procedure is performed by software code running on the management server 104. The system management procedure, however, may be performed by any combination of hardware, software, and firmware and may be performed by a single device or by multiple devices.

At step 202, the autonomy criteria is received and stored. As discussed below in further detail, the administrator enters the autonomy criteria through a user interface in the exemplary embodiment. The autonomy criteria provide information representing restrictions, priorities, or preferences relating to the execution of configuration tasks and may define a desired level of autonomy or execution rules. By applying the autonomy criteria, each configuration task of the configuration procedure can be classified either as an autonomous configuration task or a non-autonomous configuration task where an autonomous configuration task can be performed automatically without administrator direction and a non-autonomous configuration task requires administrator authorization for execution. Autonomous configuration tasks, therefore, are authorized for execution without additional administrator intervention and non-autonomous configuration tasks are unauthorized for execution without additional input from the administrator. The execution rules may directly specify non-autonomous configuration tasks or autonomous configuration tasks, may specify one or more groups of configuration tasks having a particular common characteristic defining the group as an autonomous configuration task group or a non-autonomous configuration task group, or may provide restrictions and priorities that can be applied to a configuration task to determine if the particular configuration task is an autonomous configuration task or a non-autonomous configuration task. The autonomy criteria, therefore, explicitly specify or otherwise identify any number of non-autonomous configuration tasks.

As discussed above, a suitable method of constructing the autonomy rules includes invoking a wizard utility that provides the administrator with a user interface for efficiently assembling the particular autonomy rule. As is known, a wizard typically includes a series of dialog boxes or "pages" that are presented in a particular sequence. Each page of the wizard corresponds to a step in the overall data entry task. The pages may be any combination of graphical, textual and numerical presentations. A wizard page, for example, may include data entry fields of various types, such as radio buttons, text entry fields and checkboxes, and textual instructions describing the actions that should be taken by the administrator to enter data on the current page. Often, navigational controls are displayed in conjunction with each page to permit the administrator to traverse the wizard page by page. The administrator interacts with the wizard using a mouse and keyboard, for example, to enter any data requested on the pages to create the autonomy rule. The wizard acts as buffer as the data is entered by the administrator until the wizard process is complete.

At step 204, a representation of the current status of the distributed computer system is obtained. In the exemplary embodiment, the representation of the current configuration is constructed and maintained memory. The representation may include any of several characteristics, settings, or performance parameters and at least represents some configuration parameters or configuration objects.

At step 206, it is determined whether a configuration procedure is required. The system management procedure determines a configuration procedure is required if a triggering event is detected. In the exemplary embodiment, the triggering event is any occurrence, input, or data that invokes a configuration procedure. The triggering event may be an explicit command to invoke a particular configuration procedure or may be a determination that a change in the system requires the execution of a configuration procedure. An explicit command may include either a command or instruction entered by the administrator or a command or instruction received from a process, procedure, system component or application. For example, the administrator may enter a command through a keyboard or mouse that invokes a particular configuration procedure.

In addition to an explicit command, the triggering event may be a determination that a system change requires the execution of a configuration procedure. The current system status retrieved from memory is analyzed to determine if any changes warrant the execution of a configuration procedure. A list of circumstances is compared to the system characteristics as determined by the current system status. Where a circumstance matches current system status, a configuration procedure is identified. Examples of circumstances requiring a configuration procedure include external events such as the connection of a new device 110, 102. Examples of other triggering events include the inability to communicate with a device connected within the distributed computer system, a failure of device 110, 102, 106, a change in system performance, a change in device performance, a request for additional resources, a change in available resources such as memory or channel bandwidth, the addition of an application, and the deletion of an application. The triggering event, therefore, identifies one or more configuration procedures that should be executed.

As discussed herein, "configuration procedure" refers to the setting, modification, or adjustment of at least one configuration parameter of any device within the distributed computer system. Configuration procedures, therefore, include the initial establishment of configuration objects and configuration parameters as well as the changing of configuration parameters, modification to configuration objects, instructions to a configuration object and or any other change resulting in a reconfiguration. The "configuration" of the system, therefore, is the overall status of the collections of configuration parameters and configuration objects related to the system components.

If a configuration is required, the system management process determines the appropriate configuration procedure and generates the configuration procedure at step 208. Otherwise, the system returns to step 204. The configuration procedure includes a plurality of configuration tasks that are determined based on factors such as the configuration policies, the current system configuration, system topology, available resources, the existence and location of applications, operational status, operational history, past application work loads, expected applications work loads, anticipated resource requirements, and prescribed future resource requirements.

At step 210, the configuration procedure is executed in accordance with the autonomy criteria. As described below in further detail, depending on the level of autonomy retained by the configuration procedure, the management server 104 either autonomously executes the configuration tasks or responds to commands from the administrator. In the exemplary embodiment, the configuration procedure is temporarily paused and administrator input is requested if a configuration task is determined to be a non-autonomous configuration task based on the autonomy criteria. The management server, therefore, refrains from executing a non-autonomous configuration task of a plurality of configuration tasks of an autonomy-based configuration procedure until authorization is received.

At step 212, a finalization procedure is performed. The finalization procedure may include any number of steps that completes the configuration procedure in accordance with prudent programming techniques. In the exemplary embodiment, the representation of the system configuration is updated and stored in memory. The configuration procedure results are verified by the management server as well as the administrator. In some circumstances, an email or other notification may be sent to the administrator to notify the administrator that the configuration procedure has been completed.

Figure 3:
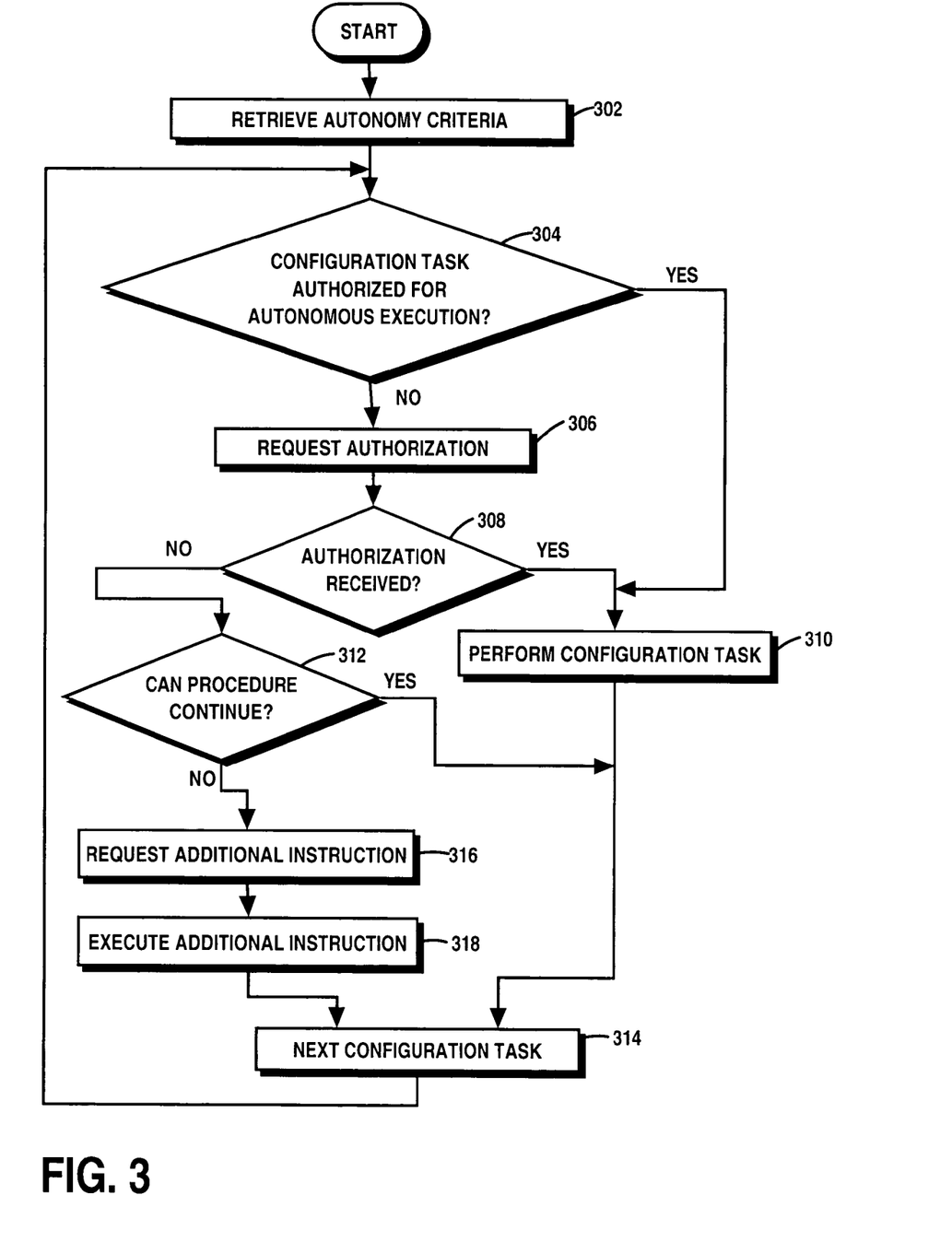
FIG. 3 is a flow chart of a method of performing an autonomy-based configuration procedure in accordance with the exemplary embodiment of the invention.

FIG. 3 is a flow chart of a method of performing an autonomy-based configuration procedure with autonomy control in accordance with the exemplary embodiment of the invention. Accordingly, the method described with reference to FIG. 3 is an exemplary method of performing step 210 of FIG. 2. Although steps 208 and 210 are illustrated as discrete steps in FIG. 2, these steps are not necessarily independent and may be performed as a single step or may be performed in conjunction with each other. For example, the configuration procedure may be generated based on the autonomy criteria and may include configuration tasks that specifically request administrator input. Further, additional steps may be performed to reflect the autonomy criteria. An updated configuration procedure, for example, may be produced after applying the autonomy criteria to the originally generated configuration procedure. The method of performing an autonomy-based configuration procedure may be implemented as part of a program product or as a stand alone program product for loading and executing on a server computer or other processor. Such a program product includes computer-executable logic that can be stored a computer readable medium and, that when executed, is configured to cause one or more of the steps described below to occur.

At step 302, the autonomy criteria are retrieved from memory. As discussed above, the autonomy criteria may be any combination of rules, policies, priorities, explicit limitations and restrictions that define a configuration task as non-autonomous or autonomous. In the exemplary embodiment, the set of autonomy rules are retrieved.

At step 304, a configuration task is evaluated to determine if the configuration task is an autonomous configuration task and is authorized for execution. The management server 104 applies the autonomy criteria to determine if the configuration task is an autonomous configuration task or a non-autonomous configuration task. As discussed above, each configuration task is represented as a data structure that contains a collection of attributes and data in the exemplary embodiment. Each of a set of autonomy rules defining the autonomy criteria are applied to the configuration task. The disposition contained in any rule that evaluates to a "TRUE" applies. If the task is an autonomous configuration task and is authorized for execution, the procedure continues at step 310 where the configuration is executed. Otherwise, it is determined that the configuration task can not be performed autonomously (without authorization) and the procedure continues at step 306. The non-autonomous configuration task, therefore, is identified based on the autonomy criteria.

At step 306, authorization is requested. In the exemplary embodiment, the configuration procedure invokes a graphic user interface (GUI) process that present a user interface to the administrator. The authorization request, in most cases, is presented through a display monitor or other visual output device. The administrator responds to the request by providing instruction through a user input device such as a keyboard or mouse. The authorization request at least requires an administrator response indicating the configuration task is authorized or is not authorized. The request may initiate further participation of the administrator in some circumstances. For example, the authorization request may provide the administrator with an option to view more information regarding the configuration task or may present options in addition to the authorizing the configuration task. Also, the authorization request may allow the administrator to change the authorization criteria. After administrator indicates that the configuration task is authorized, for example, the authorization request may provide an option allowing the administrator not to receive authorization requests for the particular configuration task in the future. In some circumstances, the authorization request may be sent to the administrator as an email.

At step 308, it is determined if the authorization has been received. If the administrator has indicated that the configuration procedure can proceed with the configuration task, the configuration procedure continues at step 310 where the configuration task is executed. At step 314, the next configuration task is evaluated.

If the administrator indicates that the configuration task can not be performed, the procedure continues at step 312, where the configuration task is not performed and the management server 104 determines if the configuration procedure can continue without executing the configuration task. If the configuration procedure can continue, the procedure continues at step 314 and the next configuration task is evaluated. Otherwise, a request for additional instruction is presented to the administrator though the user interface at step 316.

At step 318, the additional instructions presented by the administrator are executed. If additional instructions are not received or if the additional instructions can not otherwise be performed, the administrator is notified and the configuration procedure is aborted.

Figure 4:
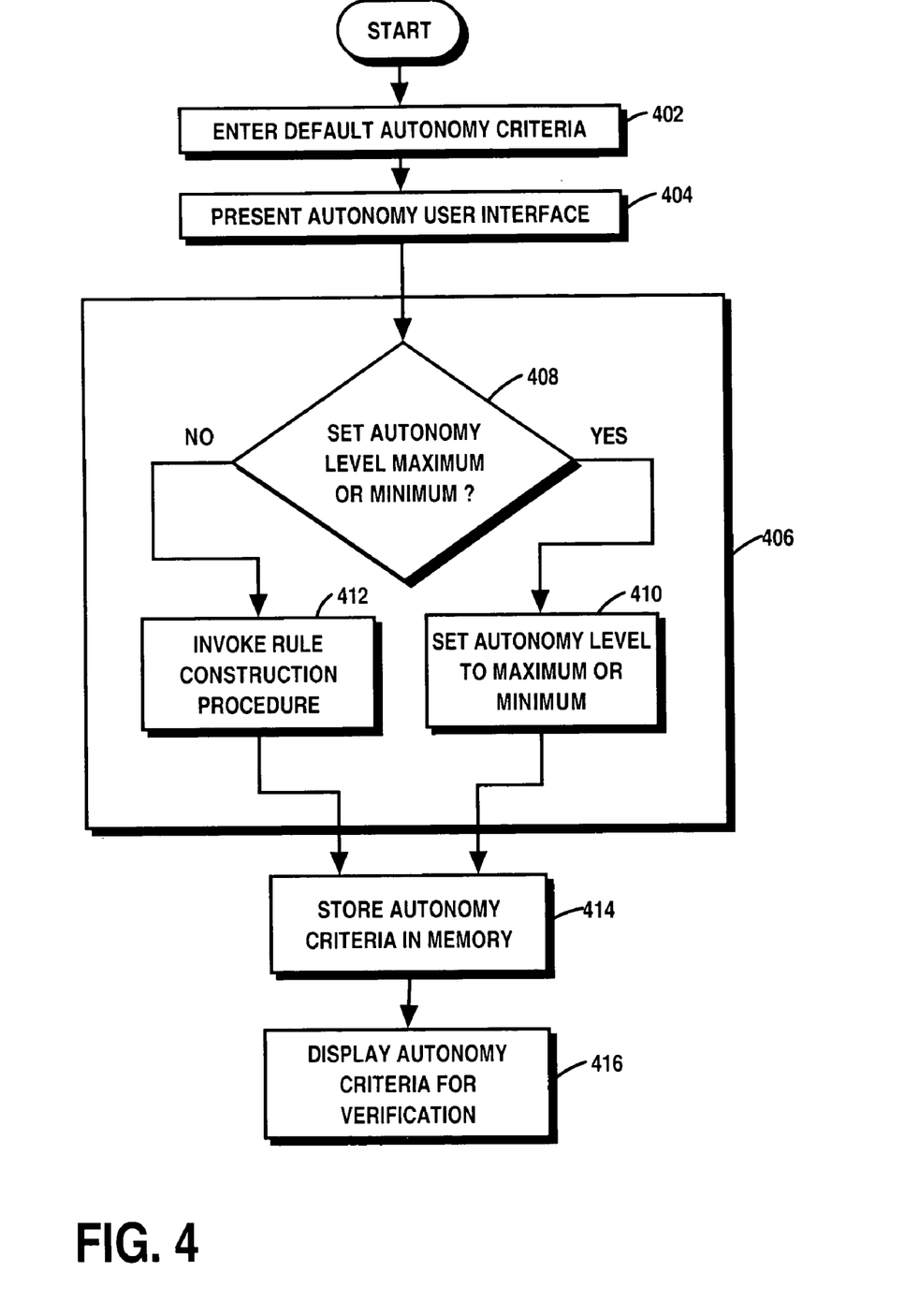
FIG. 4 is a flow chart of a method of receiving autonomy criteria in accordance with the exemplary embodiment of the invention

FIG. 4 is a flow chart of a method of receiving autonomy criteria in accordance with the exemplary embodiment of the invention. The method discussed with reference to FIG. 4, therefore, is an exemplary method for performing step 202 of FIG. 2. As discussed above, the method of receiving the autonomy criteria is implemented as a wizard utility in the exemplary embodiment. Other implementations may be used in some circumstances.

At step 402, default autonomy criteria are applied to initialize the configuration procedure. Although any default autonomy criteria may be utilized, the default autonomy criteria in the exemplary embodiment define a minimum autonomy level. With the minimum level, the configuration procedure has the maximum number of restrictions and will not perform any configuration task without administrator authorization. In the exemplary embodiment, the administrator may set the default autonomy criteria to other criteria.

At step 404, an autonomy user interface is presented. In the exemplary embodiment, the administrator access the autonomy user interface by 'logging in' to the system management procedure through using a web browser running on a terminal having access to the management server 104. The autonomy user interface may have any of numerous configurations and organizations and may be presented through several web pages or provided through a single page. In the exemplary embodiment, the autonomy user interface includes at least a level feature and a rules construction interface. The autonomy level feature provides a mechanism for the administrator to set a level of autonomy from a minimum to a maximum. Although any number of levels may be used, the exemplary autonomy level feature allows the administrator to choose from a minimum level, a maximum level and an intermediate level. The minimum autonomy level defines a set of autonomy criteria that includes a maximum restriction on the configuration procedure. Every configuration task requires administrator authorization at the minimum autonomy level. At the maximum autonomy level, the configuration does not require any administrator authorization when performing the configuration tasks and once authorized to perform the configuration procedure, automatically executes every configuration task without administrator intervention. The intermediate level includes some restrictions.

At step 406, the administrator inputs defining the autonomy criteria are accepted. An example of a suitable method for accepting the criteria includes accepting inputs entered through a user interface device such as keyboard or mouse. In the exemplary embodiment, step 406 includes steps 408-412.

At step 408, it is determined if the autonomy level is set to the maximum or minimum level. If the administrator has chosen a maximum or minimum autonomy level, the procedure continues at step 410 where the level is entered.

If any level other than the maximum or minimum is selected, the procedure continues at step 412 where the rule construction procedure is invoked. The rule construction procedure provides a user interface that allows the administrator to set rules that define the autonomy criteria. In the exemplary embodiment, a combination of pull down menus, text entry boxes and other graphical input elements allow the administrator to construct any number of rules that define the autonomy criteria. The rule construction procedure is implemented in accordance with the teachings herein as applied to known techniques for constructing rules for an application. For example, many techniques used to implement a "Rules Wizard" for Windows based applications can be applied the teachings discussed herein to implement the rule construction procedure.

At step 414, the autonomy criteria are stored in memory. In accordance with known techniques, the rules and other data defining the autonomy criteria are stored in non-volatile memory.

At step 416, the autonomy criteria are displayed to the administrator for verification. If changes are required, the procedure allows the administrator to modify the autonomy criteria.

In the exemplary embodiment, the successful execution of the method of receiving the autonomy criteria results in at least one autonomy rule and, in most circumstances, results in a set of autonomy rules that define the autonomy criteria. An example of autonomy criteria may include the following autonomy rules:

IF TARGET OBJECT IS SERVER OF THE "PRODUCTION" CLASS, THEN AUTONOMY IS DENIED.

IF THE TARGET OBJECT IS A STORAGE VOLUME ON THE "EXPERIMENTAL" STORAGE DEVICE, THEN AUTONOMY IS GRANTED.

IF THE CONFIGURATION OPERATION IS "DELETE" AND THE TARGET OBJECT IS A STORAGE VOLUME, THEN AUTONOMY IS DENIED.

IF THE CONFIGURATION OPERATION IS "CREATE" AND THE TARGET OBJECT IS A STORAGE VOLUME AND THE TIME IS BETWEEN 20:00 AND 05:00, THEN AUTONOMY IS GRANTED.

IF THE CONFIGURATION PROCEDURE IS INITIATED BY USER "FRED", THE AUTONOMY IS GRANTED.

IN ALL OTHER CASES, AUTONOMY IS DENIED.

Continuing with the example, each rule is sequentially evaluated in context of the current configuration task when the autonomy criteria are applied. If the condition evaluates to "TRUE", then the disposition contained in the evaluated rule applies. Otherwise the evaluation continues with the next autonomy rule until all rules have been evaluated. In the example, a final catchall rule applies if no other autonomy rule applies.

Those skilled in the art will recognize the various alternative methods for implementing an autonomy-based configuration procedure for a distributed computer system 100 based on the teachings herein and known techniques. Many of the steps discussed may be modified, combined or eliminated in some circumstances. Further, the configuration tasks that can be executed using an autonomy-based configuration are countless and the autonomy based configuration system is not intended to be limited to any group of configuration tasks.

The following example illustrates one of the numerous configuration procedures that can be performed using the autonomy-based configuration procedure. For the example, assume the administrator wants to monitor every removal of storage and has established autonomy criteria that do not allow any removal of storage to be executed autonomously. Such criteria provide the administrator with the option of making a last-minute decision about whether the storage volume involved should indeed be removed. Continuing with the example, assume that an application running on an application server 102 of a distributed computer system 100 is going to be removed. The application makes use of a file system built on a storage volume. For this example, the system management procedure for removing an application includes an autonomy-based configuration procedure that facilitates the removal of the file system and its storage volume, as well as all of the configuration artifacts supporting access to the file system and storage volume by the server. Such a configuration procedure may require any number of tasks depending on the particular implementation. In the example, however, the following configuration tasks are executed in accordance with the autonomy criteria:

(A) Verify no programs are using the file system at the server;

(B) Shut down the file system at the server;

(C) Change the server's configuration to so that it no longer makes use of the file system;

(D) Change the configuration of the network between the server and the storage device so as to no longer allow the server to access the storage device;

(E) Change the configuration of the storage device so the server no longer has access the storage volume;

(F) Change the configuration of the storage device so as to remove the storage volume, thus releasing its physical storage for reuse.

As is known, the contents of the file system are not actually irretrievably destroyed until the final step. At least in principal, the storage volume containing the file system could be made accessible to a server and the state of affairs would be back to more or less the status quo ante.

The autonomy-based configuration procedure is triggered by system management procedure in the example. The system management procedure invokes the autonomy-based configuration procedure when the removal of the storage is required. The triggering event, therefore, is the detection that storage removal is required. Applying the configuration tasks highlighted above to the procedure discussed with reference to FIG. 3, the autonomy criteria are applied to the configuration tasks and autonomously executed if allowed by the autonomy criteria. The various configuration tasks are performed without intervention by the administrator except for the configuration task of removing the storage volume. When this task is evaluated, a determination is made that the task can not be performed autonomously based on the autonomy criteria. The autonomy-based configuration procedure does not execute the configuration task and invokes a process that requests administrator input. A message, for example, is generated that includes an inquiry to the administrator. An example of a suitable message may include the following text:

"THE STORAGE VOLUME FOUND AT XXX.444.555. MUST BE REMOVED TO COMPLETE THE APPLICATION REMOVAL PROCEDURE. DO YOU WISH TO REMOVE THIS STORAGE VOLUME? (Y/N)"

If the administrator replies with an affirmative response, the configuration procedure continues and the task of removing the storage volume is executed. Otherwise, the task is not executed. Other follow up procedures may be executed in some circumstances. For example, a procedure may be invoked that inquires if the contents of the storage volume should be backed-up and if the storage volume can be removed after back-up.

As discussed above, the autonomy criteria may explicitly restrict the execution of a particular configuration task or may provide a policy that results in a restriction of the execution of one or more configuration tasks. For the above example, the autonomy criteria results in the restriction of any configuration procedure that involves the removal of a storage volume. Examples of configuration procedures that may include configuration tasks of storage volume removal include: a configuration procedure including only a configuration task for removing a storage volume (an explicit storage removal configuration procedure); a configuration procedure for removal of an application (as in the example above); a configuration procedure for storage migration where the contents of an old storage volume is copied to a new storage volume and the old storage volume is removed; a configuration procedure for removing objects or physical elements (e.g. a database) that require the removal of a storage volume; and configuration procedures addressing a storage volume that is in use by multiple servers, as in a cluster environment).

Accordingly, the administrator can establish autonomy criteria that define a policy not allowing the autonomous removal of storage volumes and any configuration procedure including a configuration task of removing a storage volume will be halted. The administrator only establishes the autonomy criteria once and all potential situations regarding storage volume removal are covered. In particular, the administrator is not required modify any of the configuration procedures that might involve a storage volume removal task. Alternatively, by specifying more restrictive autonomy criteria, the administrator could choose to restrict the autonomy only for certain storage volumes. For example, the administrator may establish autonomy criteria that restrict removal of storage volumes that the administrator considers to be most valuable.

Therefore, the system, apparatus and method in accordance with the invention provides an administrator with a valuable tool for managing a distributed computer network 108. The autonomy criteria either explicitly identify a configuration task that can not be executed autonomously or define a configuration policy that restricts the autonomous execution of one or more configuration tasks.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method of configuring a distributed computer system, the method comprising:
    retrieving autonomy criteria identifying at least one non-autonomous configuration task that should not be autonomously executed;
    identifying the at least one non-autonomous configuration task by applying the autonomy criteria to each configuration task of an autonomy-based configuration procedure for configuring a distributed computer system;
    requesting authorization for executing the at least one non-autonomous configuration task; and
    refraining from executing the at least one non-autonomous configuration task until authorization is received from an administrator.

2. A method in accordance with claim 1, wherein the requesting comprises:
    generating an inquiry identifying the at least one non-autonomous configuration task and indicating that administrator input is required to execute the unauthorized at least one non-autonomous configuration task.

3. A method in accordance with claim 2, further comprising:
    executing the at least one non-autonomous configuration task after the administrator input is received, the administrator input acknowledging the at least one non-autonomous configuration task should be executed.

4. A method in accordance with claim 1, further comprising:
    aborting the configuration procedure when the administrator input is received, the administrator input indicating the at least one non-autonomous configuration task should not be executed.

5. A method of configuring a distributed computer system, the method comprising:
    receiving autonomy criteria entered by an administrator through a user interface;
    retrieving autonomy criteria identifying at least one non-autonomous configuration task that should not be executed without authorization, the at least one non-autonomous configuration task resulting in a change of at least one configuration parameter when executed;
    identifying the at least one non-autonomous configuration task by applying the autonomy criteria to each configuration task of an autonomy-based configuration procedure for configuring a distributed computer system;
    requesting authorization for executing the at least one non-autonomous configuration task; and
    refraining from executing the at least one non-autonomous configuration task until authorization is received from an administrator.

6. A management server for managing a distributed computer system, the management server comprising:
    computer-executable logic stored on a computer readable medium, the computer-executable logic configured to cause the following steps to occur:
    retrieving autonomy criteria identifying at least one non-autonomous configuration task that should not be autonomously executed;
    identifying the at least one non-autonomous configuration task by applying the autonomy criteria to each configuration task of an autonomy-based configuration procedure for configuring a distributed computer system;
    requesting authorization for executing the at least one non-autonomous configuration task; and
    refraining from executing the at least one non-autonomous configuration task until authorization is received from an administrator.

7. A management server in accordance with claim 6, wherein the step of requesting comprises:
    generating an inquiry identifying the at least one non-autonomous configuration task and indicating that administrator input is required to execute the at least one non-autonomous configuration task.

8. A management server in accordance with claim 7, the computer-executable logic configured to further cause the following step to occur:
    executing the at least one non-autonomous configuration task after the administrator input is received, the administrator input acknowledging the at least one non-autonomous configuration task should be executed.

9. A management server in accordance with claim 6, the computer-executable logic configured to further cause the following step to occur:

aborting the configuration procedure when the administrator input is received, the administrator input indicating the at least one non-autonomous configuration task should not be executed.

10. A program product for managing a distributed computer system, the program product comprising:
   computer-executable logic contained on a computer-readable medium and configured for causing the following computer-executed steps to occur:
   retrieving autonomy criteria identifying at least one non-autonomous configuration task that should not be autonomously executed;
   identifying the at least one non-autonomous configuration task by applying the autonomy criteria to each configuration task of an autonomy-based configuration procedure for configuring a distributed computer system;
   requesting authorization for executing the at least one non-autonomous configuration task; and
   refraining from executing the at least one non-autonomous configuration task until authorization is received from an administrator.

11. A program product in accordance with claim 10, wherein the step of requesting comprises:
   generating an inquiry identifying the at least one non-autonomous configuration task and indicating that administrator input is required to execute the at least one non-autonomous configuration task.

12. A program product in accordance with claim 11, the computer-executable logic configured to further cause the following step to occur:
   aborting the configuration procedure when the administrator input is received, the administrator input indicating the at least one non-autonomous configuration task should not be executed.

13. A program product in accordance with claim 10, the computer-executable logic configured to further cause the following step to occur:
   executing the at least one non-autonomous configuration task after the administrator input is received, the administrator input acknowledging the at least one non-autonomous configuration task should be executed.

14. A data storage system that communicates with a computer which has application software that manipulates data that can be stored on the data storage system and the system including computer-executable logic for configuring a distributed computer system, the data storage system comprising:
   a plurality of storage devices; and
   computer-executable logic configured for causing the following computer-executed steps to occur:
   retrieving autonomy criteria identifying at least one non-autonomous configuration task that should not be autonomously executed;
   identifying the at least one non-autonomous configuration task by applying the autonomy criteria to each configuration task of an autonomy-based configuration procedure for configuring a distributed computer system;
   requesting authorization for executing the at least one non-autonomous configuration task; and
   refraining from executing the at least one non-autonomous configuration task until authorization is received from an administrator.

15. A data storage system in accordance with claim 14, wherein the step of requesting comprises:
   generating an inquiry identifying the at least one non-autonomous configuration task and indicating that administrator input is required to execute the at least one non-autonomous configuration task.

16. A data storage system in accordance with claim 15, the computer-executable logic configured to further cause the following step to occur:
   executing the at least one non-autonomous configuration task after the administrator input is received, the administrator input acknowledging the at least one non-autonomous configuration task should be executed.

17. A data storage system in accordance with claim 14, the computer-executable logic configured to further cause the following step to occur:
   aborting the configuration procedure when the administrator input is received, the administrator input indicating the at least one non-autonomous configuration task should not be executed.

18. A management server for managing a distributed computer system, the management server comprising:
   a processor and a memory;
   retrieving means for retrieving autonomy criteria identifying at least one non-autonomous configuration task that should not be autonomously executed;
   identifying means for identifying the at least one non-autonomous configuration task by applying the autonomy criteria to each configuration task of an autonomy-based configuration procedure for configuring a distributed computer system;
   requesting means for requesting authorization for executing the at least one non-autonomous configuration task; and
   refraining means for refraining from executing the at least one non-autonomous configuration task until authorization is received from an administrator, the retrieving means, the identifying means, the requesting means, and the refraining means included at least partially within at least one of the processor and memory.

19. A management server in accordance with claim 18, wherein the requesting means comprises:
   generating means for generating an inquiry identifying the at least one non-autonomous configuration task and indicating that administrator input is required to execute the at least one non-autonomous configuration task.

20. A management server in accordance with claim 19 further comprising:
   executing means for executing the at least one non-autonomous configuration task after the administrator input is received, the administrator input acknowledging the at least one non-autonomous configuration task should be executed.

21. A management server in accordance with claim 18, the management server further comprising:
   an aborting means for aborting the configuration procedure when the administrator input is received, the administrator input indicating the at least one non-autonomous configuration task should not be executed.

* * * * *